No. 762,550. PATENTED JUNE 14, 1904.
C. H. NORTON.
STEADY REST.
APPLICATION FILED JUNE 5, 1901. RENEWED MAY 23, 1904.
NO MODEL. 2 SHEETS—SHEET 2.
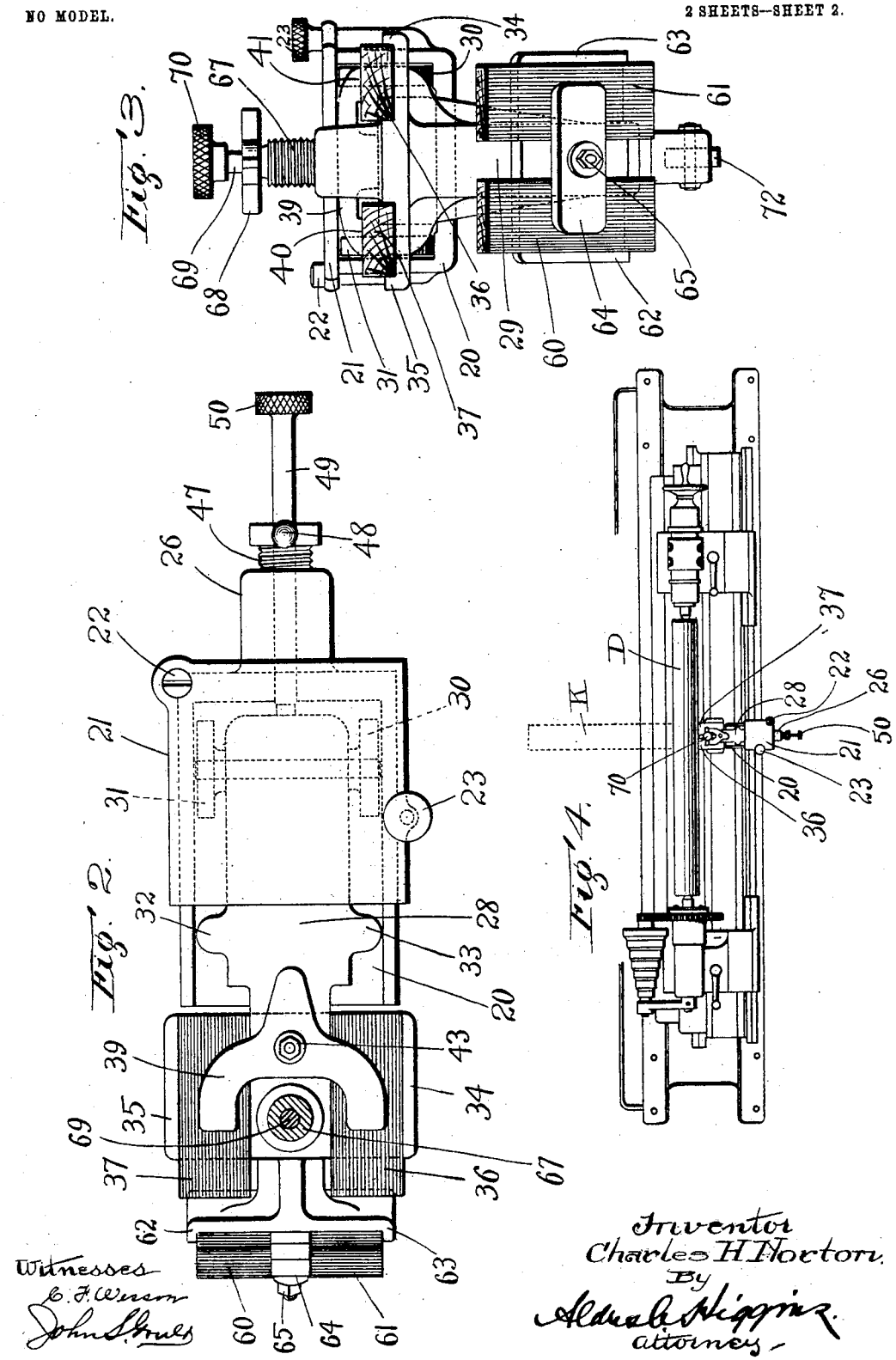
Witnesses
C. F. Wesson
John S. Bruff
Inventor
Charles H. Norton
By
Aldus C. Higgins
Attorney No. 762,550. Patented June 14, 1904.

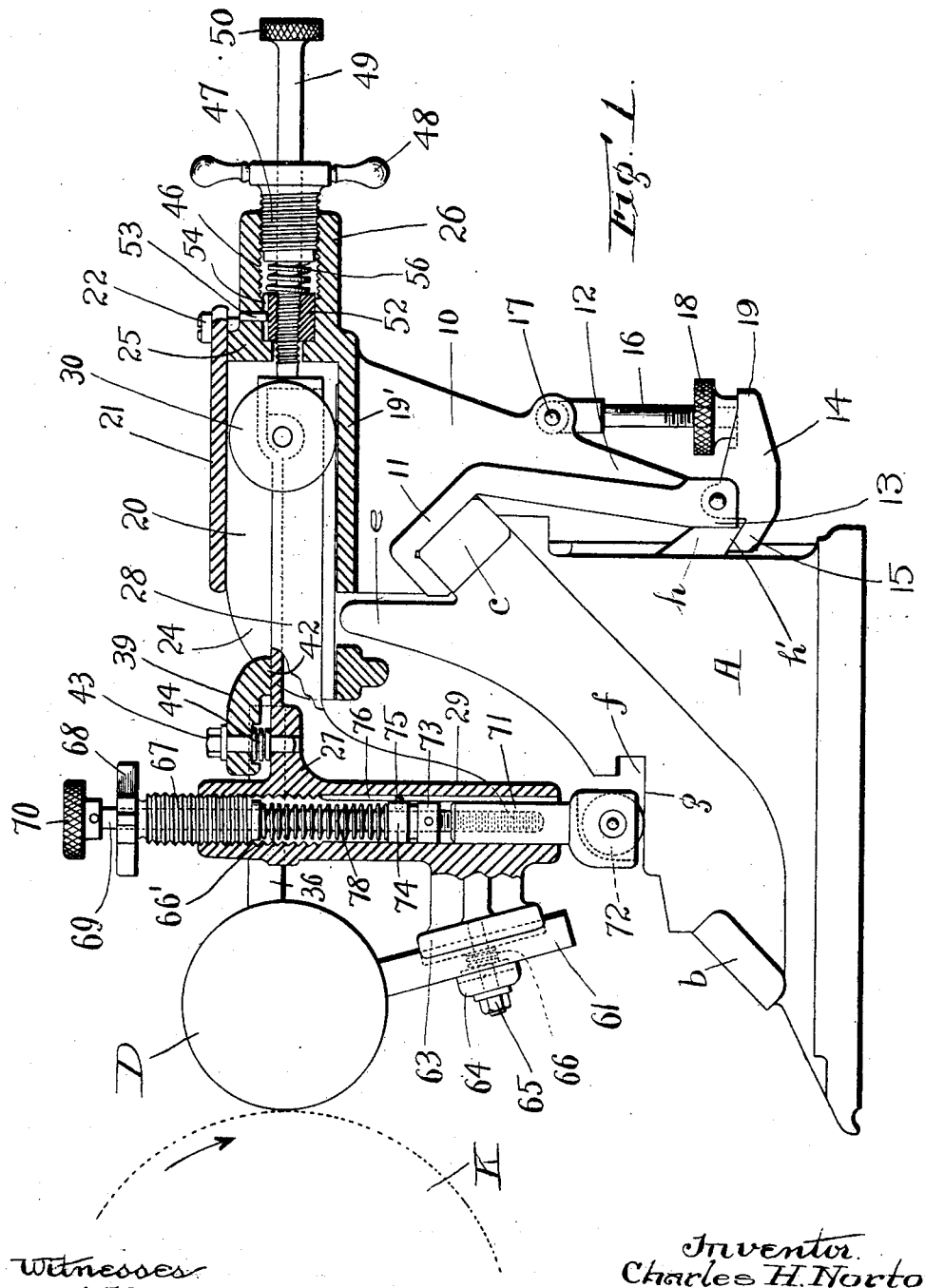

UNITED STATES PATENT OFFICE.

CHARLES H. NORTON, OF WORCESTER, MASSACHUSETTS, ASSIGNOR TO NORTON GRINDING COMPANY, OF WORCESTER, MASSACHUSETTS, A CORPORATION OF MASSACHUSETTS.

STEADY-REST.

SPECIFICATION forming part of Letters Patent No. 762,550, dated June 14, 1904.

Application filed June 5, 1901. Renewed May 23, 1904. Serial No. 209,312. (No model.)

*To all whom it may concern:*

Be it known that I, CHARLES H. NORTON, a citizen of the United States of America, and a resident of Worcester, county of Worcester, and Commonwealth of Massachusetts, have invented certain new and useful Improvements in Steady-Rests, of which the following is a specification.

My invention relates to steady-rests for steadying the work to be operated upon in a lathe or grinding-machine. The work is usually supported at each end on centers mounted, respectively, in the head and tail stocks of the machine. This old and well-known means of supporting the work at separated points as nearly as possible on the axis of revolution is extremely simple and would be very accurate were there not a lack of rigidity in the work when operated upon, if centers are depended upon alone to hold the work against the pressure of the tool or grinding-wheel, especially if the centers are widely separated or the work is light or the operation upon the same heavy. This is a very serious objection where accuracy is desired. Other means of support, such as steady-rests, must therefore be employed to bear on the circumference of the work between the centers to hold all parts of the same true to the axis of revolution against the pressure of the tool or wheel. This is particularly necessary in grinding machinery adapted for cylindrical and round taper work, where extreme accuracy is required. My invention though particularly designed for such work is equally adapted for lathe or other work requiring the employment of a steady-rest. In the cylindrical grinding-machine it is found that however the ends of the work may be supported and even when the size of the work and the distance between the centers would seem to assure sufficient rigidity the operation of a grinding-wheel on such work causes it to yield or chatter to such an extent that the desired accuracy cannot be attained. The forces exerted on the work by the grinding-wheel are those due to the pressure of the wheel against the work and to the cutting action of the wheel in its revolution. The direction of the resultant against which the steady-rest must act will obviously vary for different speeds and depths of cut. A steady-rest for such a machine should exert its pressure on the work as nearly as possible in a direction opposite to that in which the resultant pressure is exerted on the work by the grinding-wheel; but in order that it may have a practical range of operation it should bear against the work in two different planes, passing through the axis of revolution, between which the resultant will in any event be found. It should support the work so as to allow the grinding-wheel to be moved over the entire length thereof. It should exert a practically uniform pressure for any one of a number of successive chips or cuts. It should be capable of being adjusted for different pressures for different kinds of work and of being adjusted during the progress of the work to compensate for stock removed. It should also be adapted to be rigidly mounted to the work-supporting table.

My invention consists of means embodying, among others, these main features severally and in combination and also in details of construction, hereinafter specifically pointed out.

Figure 1 is a transverse sectional view through the steady-rest as applied to the table of a grinding-machine. Fig. 2 is a plan view. Fig. 3 is an elevation taken from the work side of the rest, and Fig. 4 is a plan view illustrating its application to the work on the grinding-machine.

In Fig. 1, A indicates a base, which in the instance shown is the table of a grinding-machine having the two widely-separated ways $b$ and $c$ for the head and tail-stocks. The way $b$ is located below the work D, and the way $c$ is located behind the water-guard $e$. Between the two ways is the groove $f$, having a horizontal portion $g$ upon which the steady-rest secures a bearing. K indicates the grinding-wheel. The steady-rest also has a bearing on the way $c$ and is held rigidly to the table by a connection between said way $c$ and a steady-rest-holding way $h$ at the back and near the lower part of the table. While the steady-rest illustrated and now about to be described is shown to fit this particular form of table, it may be fitted to any other form of bed or table without departing from the scope of my invention, as such adaptation would fall within the province of the skilled mechanic. The steady-rest is fastened rigidly to the table by means of the main support 10, having the angular bearing 11, engaging the way c, and having the downward extension 12. Said extension 12 is provided with the bearing 13, adapted to rest against the way h. Opposite the way h the swing-catch 14 is pivoted to said extension and is provided with the dog 15, adapted to engage beneath the angular portion h' of way h and to be held firmly against the same by the bolt 16, hinged at 17 and carrying the nut 18, adapted to be set against an extension 19 of said catch. This clamps and holds the main support 10 fast to the table. The horizontal portion 19' of the main support is preferably made in the shape of a rectangular box 20, located with its center line opposite the axis of the work, and is provided with the cover 21, swung on the hinge-screw 22, and held in closed position by the thumb-screw 23. This box portion is open at the end 24 nearest the work and at the opposite end 25 is provided with the rigid barrel 26, containing the adjusting mechanism hereinafter described.

The bearing or contact block carrier 27 comprises two legs substantially at right angles to each other 28 29. The horizontal leg 28 is mounted in said box portion of the fixed support horizontally and adapted for horizontal movement therein by being provided with a pair of supporting-wheels 30 31, adapted to run on the bottom of said box. The horizontal leg is mounted on said wheels, so that it has no other bearing on the bottom of said box, thus allowing for a vertical adjustment at the outer or bearing end of said leg without substantially affecting the horizontal movement thereof. The vertical leg 29 rests upon the bearing g, which forms the vertical support of said carrier beneath the work. This vertical support on the bearing g and the horizontal support, through the main support 10 on the bearing c, form the two separated supports for the carrier herein referred to. These legs 28 29, respectively, carry the bearings located in different planes passing through the axis of the work. The integral lugs 32 33 serve to maintain the position of the carrier in the middle of the box, though a close fit is not necessary, some latitude of movement being desirable. The horizontal leg 28 of the carrier is provided outside of the box with the lateral extensions 34 35, in which the hardwood blocks 36 37 are adapted to fit and to be held by the clamp 39. Said clamp has three bearing-points, two of which, 40 41, bear on the blocks 36 37, respectively, the third, 42, bearing on the horizontal leg. This clamp is held firmly and set down on the blocks by the clamp-screw 43, screwing into the horizontal leg. Preferably a spiral compression-spring 44 is located between said clamp and leg. The said blocks or bearings bear against the work in the grinding-machine or lathe. They may be either wood or metal and integral, rigidly attached, or held by clamps or otherwise, as desired. They are forced with the proper pressure against the work and adjusted to and from it by the following mechanism. The barrel 26 is internally threaded at 46 to fit the hollow tension-screw 47. This tension-screw is provided with the handles 48 and is bored out to allow the free passage through it of the adjusting-rod 49, having the thumb-head 50. The adjusting-rod freely passes through said screw and the inner end of the barrel or the closed end 25 of the box and bears against the horizontal leg 28 of the block-carrier. This adjusting-rod is screw-threaded for a portion of its length where it passes through said barrel and is threaded through the nut 52 within said barrel. Said nut is held from revolving by the pin 53, fitting the longitudinal slot 54 in said nut. Between the nut and the tension-screw, around said adjusting-rod, a stiff spiral compression-spring 56 may be located which when compressed by the tension-screw between it and the nut causes the adjusting-rod to be forced against the horizontal leg of the block-carrier, thus providing a strong, somewhat yielding, adjustable, and comparatively constant pressure, which may be accurately adjusted and maintained as the stock is removed from the work by screwing in the adjusting-rod. Said spring is not, however, essential in the operation of a steady-rest on a grinding-machine, as the skilled operator can adjust the tension-screw 47 to secure the proper pressure without the spring. Thus any give due to the use of the spring can be avoided, which in some classes of work is desirable. Extending downward from the end of said horizontal leg beneath the horizontal bearing-blocks and over the way g is the vertical leg 29, which is integral with said horizontal leg and forms the support for the vertical bearings or blocks 60 61. These vertical bearing-blocks are fastened to the extensions 62 63, formed integral with the vertical leg and held by the clamp 64 and set-screw 65, provided, preferably, with the spring 66, as in the case of the horizontal blocks. Said vertical bearings may be integral, rigid, or held as desired. Said vertical leg is formed hollow and at the upper end is internally screw-threaded at 66' to receive the threaded tension-plug 67, having the hand-wheel 68. Extending downward loosely through said plug is the adjusting-rod 69, having in its upper end the thumb-head 70. Said rod is threaded into the support or plug 71, which is loosely mounted in said vertical leg and provided with the wheel 72, resting on the way *g*. The adjusting-rod is provided with the collar 73, pinned to the rod, and above and resting on said collar is the collar 74, having the pin 75, sliding in the slot 76 in said vertical leg. Between said collar 74 and the tension-screw around the adjusting-rod may be located the spiral compression-spring 78. The compression-spring acts between said tension-plug and collar, forcing the supporting-plug downward against the way and said bearing-blocks 60 61 upward against the work. The use of this spring is, however, not essential, for the same reason as pointed out above in the case of spring 56.

It will thus be seen that the work is supported in two planes against the action of the grinding-wheel. In the operation of the device with the grinding-machine the character of the support and adjusting mechanism is such that the most accurate adjustment can be had. The springs may be adjusted by the tension-screws to furnish the proper pressure for the character of work or tool, amount of cut and weight of work being done. The adjustment for the amount of stock taken off by each can be readily made by the adjusting-screws. In case of very heavy work or work of large diameter it is sometimes advantageous to remove the carrier entirely, inserting in the rectangular box 20 a block of wood or bearing, which is pressed against the work by the adjusting-screw 49.

In the operation of the grinding-machine fitted with these steady-rests a skilful operator by observing the action of the grinding-wheel and by feeling its action through the adjustment of the adjusting-screws can so regulate the pressure on each leg that the resultant force tending to put the work out of true may be accurately overcome and heavy cuts may be taken with extreme accuracy.

While I have shown and described the steady-rest as applied to a grinding-machine, it is obvious it may be employed for similar purpose on a lathe or other tool-machine and also that changes may be made in its construction without departing from the spirit and scope of my invention.

I claim—

1. In a steady-rest the combination with a carrier, of work-bearings rigidly mounted in said carrier in different planes, said carrier having separated supports adapted to be mounted on a rigid base and means for adjusting said carrier in either plane.

2. In a steady-rest the combination with work-bearings mounted in different planes, of separated supports located to act substantially in said planes and bearing on a rigid base and means between said base and said work-bearings for adjusting said bearings against the work.

3. The combination with a base, of a carrier provided with work-bearings adapted to bear on the work in two directions said carrier having two separated supports between said base and said bearings, and means between said base and said carrier for forcing said bearings against the work.

4. The combination with a base, of a carrier provided with bearings adapted to act in different planes and having separated supports between said base and said bearings and means for exerting pressure on said carrier independently in each respective plane whereby said bearings are forced against the work.

5. The combination with a base, of a carrier having legs extending in two directions and supported against said base, bearings on each of said legs and independent adjusting means for each leg acting between the work and said base to force said bearings against said work.

6. In a steady-rest the combination with two connected bearings adapted to be held against the work in different planes and two separated supports for said connected bearings respectively located in said planes and means for adjusting said work-bearings in each plane.

7. The combination with a base, of a main support rigidly mounted on said base, a rigid carrier having bearings extending in different directions, and two legs respectively extending in directions opposite to said bearings, one of said legs mounted in said rigid support and the other mounted on said base.

8. The combination with a base, of a main support mounted rigidly on said base, a rigid carrier having a substantially horizontal carrier-leg and a horizontal bearing for the work, horizontal adjusting means for said horizontal leg, a substantially vertical carrier-leg having a bearing for the work, a separate support on said base for said vertical leg and adjusting means for said vertical leg, substantially as described.

9. The combination with a base, of substantially horizontal and vertical work-bearings rigidly connected together, separate horizontal and vertical adjusting means, and two separate supports mounted on said base whereby a rigid bearing may be secured between said work and said base in two directions.

10. The combination with a base, of a support rigidly attached to said base, a substantially horizontal work-bearing carrier having a bearing for said work, and adjusting means between said support and said carrier, a substantially vertical work-bearing carrier, having a bearing for said work, a support for said carrier having a bearing on said base and adjusting means between said support and said carrier.

11. The combination with the base, of a support rigidly attached to said base, of a substantially right-angular carrier having work-bearing blocks and mounted with one leg substantially horizontal and on said support and the other leg substantially vertical on said base, and adjusting means for each leg.

12. The combination with a base, of a support rigidly attached to said base, a substantially horizontal work-bearing carrier having a bearing-block for said work, an adjusting-screw between said carrier and said support, a substantially vertical work-bearing carrier having a bearing-block for said work, a support for said carrier having a bearing on said base, and an adjusting-screw between said vertical work-bearing carrier and said base, substantially as described.

13. The combination with a base, of a support rigidly attached to said base, a rigid work-bearing carrier having a substantially horizontal leg and carrying a bearing-block for said work, an adjusting-screw between said carrier and said support, said carrier also having a substantially vertical leg and carrying a bearing-block for said work, a support for said carrier on said base and an adjusting-screw between said carrier and said base substantially as described.

14. In a steady-rest the combination with a rigid supporting means, of a carrier having work-bearing blocks, and means for adjusting said carrier comprising an adjusting-screw, a spiral spring bearing against said screw and a nut for adjusting said spring, substantially as described.

15. The combination with a steady-rest having two separated bearing-supports, of a base having ways $b$, $c$, and a way $g$, between said first-mentioned ways whereby said steady-rest is firmly supported substantially beneath the work.

16. The combination with a steady-rest having a support 10, of a base having the ways $c$ and $h$ on which said support is mounted and held.

17. The combination with a steady-rest having two separated bearing-supports, of a base having the three separated bearings $g$, $c$, and $h$, means for holding said rest rigidly between two of said bearings and means for mounting said rest firmly on said third bearing, substantially as described.

18. The combination with the slanting table of a grinding-machine, of a steady-rest having work-bearings in different planes and having supports on said table in different planes.

Signed by me at Worcester, aforesaid, this 24th day of May, 1901.

CHARLES H. NORTON.

Witnesses:
W. A. REED,
ALDUS C. HIGGINS.